United States Patent
Jansen et al.

(10) Patent No.: US 7,676,491 B2
(45) Date of Patent: Mar. 9, 2010

(54) METHOD AND SYSTEM FOR ACCESSING A FILE SYSTEM

(75) Inventors: Marten Jansen, Nijmegen (NL); Johannes E Spijkerbosch, Tiel (NL)

(73) Assignee: Oce-Technologies B.V., Venlo (NL)

( * ) Notice: Subject to any disclaimer, the term of this patent is extended or adjusted under 35 U.S.C. 154(b) by 355 days.

(21) Appl. No.: 11/657,093

(22) Filed: Jan. 24, 2007

(65) Prior Publication Data
US 2007/0185829 A1 Aug. 9, 2007

(30) Foreign Application Priority Data
Jan. 25, 2006 (EP) .................................. 06100861

(51) Int. Cl.
*G06F 17/30* (2006.01)

(52) U.S. Cl. ...................... 707/102; 707/100; 707/101; 707/103 R

(58) Field of Classification Search ................. 707/100, 707/102, 103 R; 715/748
See application file for complete search history.

(56) References Cited

U.S. PATENT DOCUMENTS

| | | | |
|---|---|---|---|
| 6,462,778 B1 * | 10/2002 | Abram et al. | 348/239 |
| 7,039,873 B2 * | 5/2006 | Morris et al. | 715/748 |
| 2003/0063321 A1 * | 4/2003 | Inoue et al. | 358/302 |
| 2004/0030539 A1 * | 2/2004 | Tsai et al. | 703/21 |
| 2005/0172122 A1 * | 8/2005 | Risan et al. | 713/165 |
| 2005/0193030 A1 * | 9/2005 | Abe | 707/200 |
| 2007/0033540 A1 * | 2/2007 | Bridges et al. | 715/769 |

* cited by examiner

*Primary Examiner*—Cam-Linh Nguyen
(74) *Attorney, Agent, or Firm*—Birch, Stewart, Kolasch & Birch, LLP

(57) ABSTRACT

A method for accessing a file system and for subsequently presenting to a user a list of files in store, where files in the list are identified by names derived from the contents of the files. the method is suitable for use in a reprographic apparatus, for access to a file system on a removable storage device and for displaying on the operator screen of the apparatus, the list of files on the storage device, the files being available for selection for printing by the operator.

14 Claims, 6 Drawing Sheets

METHOD AND SYSTEM FOR ACCESSING A FILE SYSTEM

CROSS-REFERENCE TO RELATED APPLICATIONS

This nonprovisional application claims priority under 35 U.S.C. §119(a) on Patent Application No. 06100861.1, filed in the European Patent Office on Jan. 25, 2007, the entirety of which is incorporated herein by reference.

BACKGROUND OF THE INVENTION

1. Field of the Invention

The present invention relates to a method for accessing a file system, in a computer system having a storage, the storage provided with a file system, the file system storing for each file a first file name, metadata and file contents. In particular, the present invention relates to exchanging files between computer systems or between a computer system and a reprographic apparatus.

2. Description of Background Art

A file system implements on a bare storage medium an environment where files can be stored and operations on files can be carried out. The file system organizes all files and directories on a storage device. A variety of file systems are known. A well-known file system is the FAT (File Allocation Table) file system.

A disadvantage of this file system is limitations posed on the length of the file name and the length of the extension and on the character set that is supported.

An operating system of a computer system has the task to carry out operations on the file system. Not all operating systems provide support for all file systems.

When one exchanges files between computer systems by means of a portable storage device, provided with a particular file system, both the source operating system and the destination operating system must be able to handle the file system.

For compatibility reasons, often the FAT file system is implemented on a portable storage device. However this poses limitations on i.e. the file name as indicated above.

If a portable storage device is used to print files on a printer, a list of files available on the storage device, when mounted on the printer, will be displayed on the operator screen for selection by the user for printing. This is shown in FIG. 1. In this case, if a user attaches the removable storage (101) to a copier/printer/scanner multifunctional device, also referred to as an MFD, this MFD will display on its operator panel (102) identifiers of all files that it is capable to print on the user interface display. In order to do so, the MFD will read the names from the file properties (104) and examine the contents (105) of the files stored in the attached file system (106) of the removable storage. Again, the names are subject to changes because of the capabilities of the used file system on the MFD. This problem is very observable when an FAT file system is used, which limits the number of characters to the 8.3 format (8 characters for the name, followed by a dot and three characters for the extension, indicating the type of the file) and allows only the character-set as defined in ASCII.

At the moment, if the user wishes to select files in a possibly large list of other files on the display of the MFD, the user must be able to distinguish the presented file-identifiers from a possibly large list. Presenting only the filename, or what is left of it, may not be the best possible method for this purpose.

SUMMARY OF THE INVENTION

In view of the above, there is a need to be able to show on the operator screen of the printer names of the files that are not hampered by the limitation in length or limitation in character set.

To this end, the method according to the present invention for accessing the file system comprises the steps of:

extracting from the file contents of a file, supplemental data, where any of the supplemental data is a second file name;

compiling a list of files in the storage, where an entry in the list comprises a name field; and assigning the second file name to the name field if the extracting step delivers a second file name as one of the supplemental data from the file contents.

It is an objective of the present invention to avoid the usage of the filename provided by the file system and to use a better identification method instead. This method is based on the contents of the file, as this is the only (unchanged) item available at the MFD.

The strategy to solve this problem is to extract the pieces of information that are useful for identification from the contents of the file, and to construct a textual description of the file from it. The pieces of information that are useful for this purpose are, for instance, the title, the subject, the keywords, the author, the document type and the creation or modification date.

To obtain useful pieces of information, the format of each file must be known first. This is accomplished by using programs that peek in the contents to format specific tokens. Second, a format specific analyzer will search for the information needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
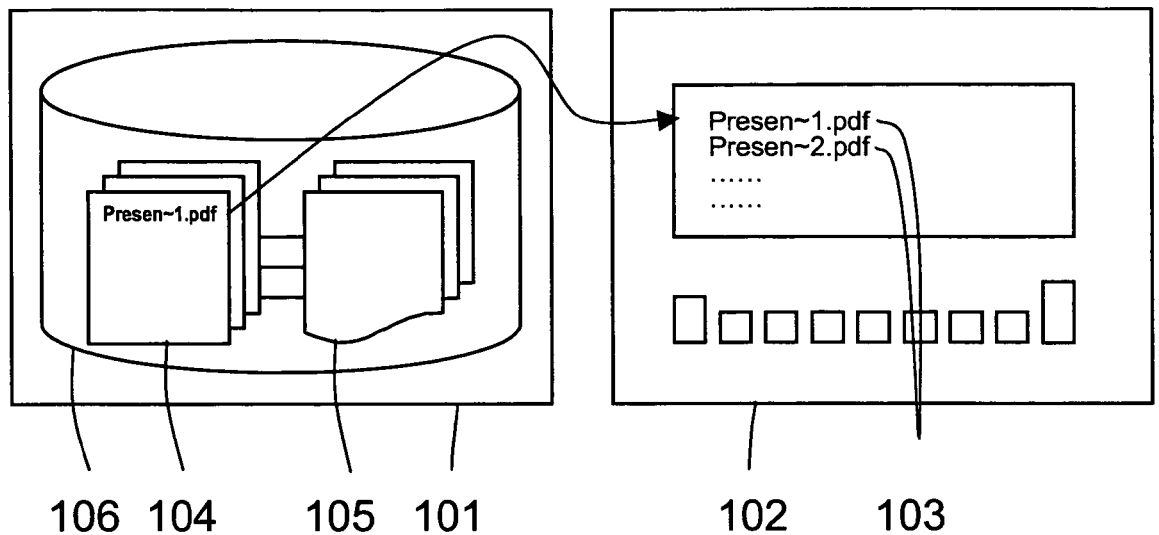
FIG. 1 is a schematic diagram of a file system.

The present invention will now be described with reference to the accompanying drawings, wherein the same reference numerals will be used to identify the same of similar elements.

Figure 2:
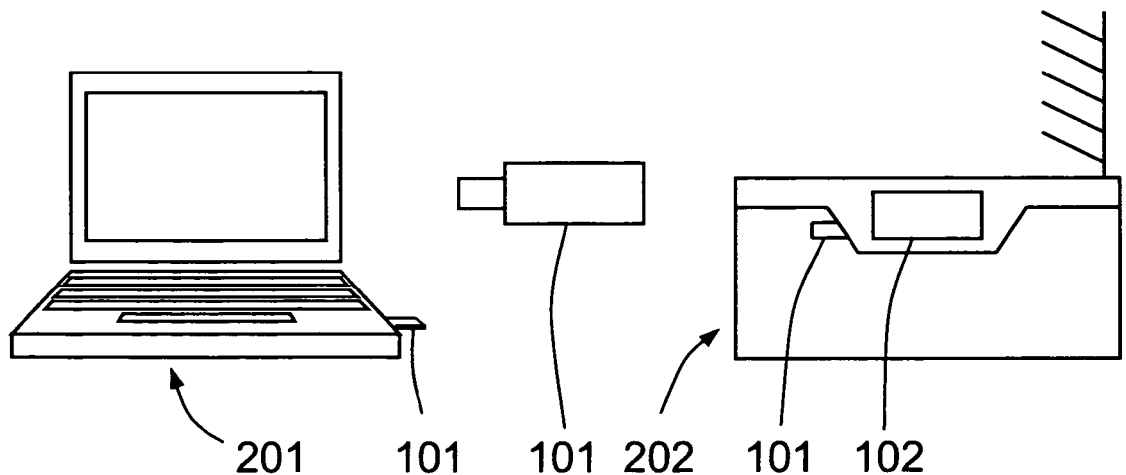
FIG. 2 is a schematic diagram of a system that is suitable for the present invention.

FIG. 2 illustrates a system that is suitable for the present invention. The system includes a workstation (201), or any other general-purpose computer system. The system also includes a reprographic apparatus (202) and a removable storage device (101). An example of a removable storage device is a portable USB storage device, e.g. a USB stick. Both the workstation (201) and the reprographic apparatus (202) are provided with facilities for reading from and writing to a removable storage device, e.g. a USB slot. Also other portable storage devices are envisaged such as a floppy disk, or storage devices that connect via e.g. an infrared connection with the general computer, as long as the general computer is able to access it as a file system.

The reprographic apparatus may be a scanner, a printer or a combination of both.

The system presented is suitable for printing via a removable storage device. In particular situations this is advantageous. It provides an easy-to-use printing and scanning solution in case the network and/or application infrastructure is not available in general, or not available for a particular user. It is advantageous also in cases where a printing infrastructure is not available or is not configured to print to the desired printer, e.g. a user with a laptop, who wants to print a document on a printer that is located near a meeting room. Note that in this case the user has probably not installed the correct printer driver. It is also advantageous in cases where a scanning infrastructure (e.g. scan-to-Email, scan-to-intraLogic, ScanLogic) at the desired MFD is not configured for the user; or in cases where the size of the scanned document exceeds the limit of scan-to-Email; and in cases where security is an issue and network security is not guaranteed. In these situations, a USB storage device can be used as a "pocket mailbox" for print jobs and scan jobs.

The method according to the present invention for printing via a removable storage device will now be described in detail. At first when a user, at his workstation, wants to prepare a document for printing via the removable storage device, he has to select the "print-to-file" option in the printer driver. If the user already wants to make settings for his print job, he has to do this explicitly in the operator screen, which shows up upon activation of the driver. When the user presses the OK button in the driver he is prompted to specify a filename and location for the print file. Subsequently, the print file is written to the USB storage device.

In another variant, the user selects one or more files on his workstation with the intention to print the contents of these. The person is able to identify these files by means of, among others, a name associated with the file stored in the file system on the computer. Other methods of identification may be an associated icon, color or location in the file system hierarchy.

When the files to be printed have been written on the USB storage the user removes the USB memory stick from his workstation, walks to the reprographic machine and plugs it into the USB slot on the machine.

Figure 3:
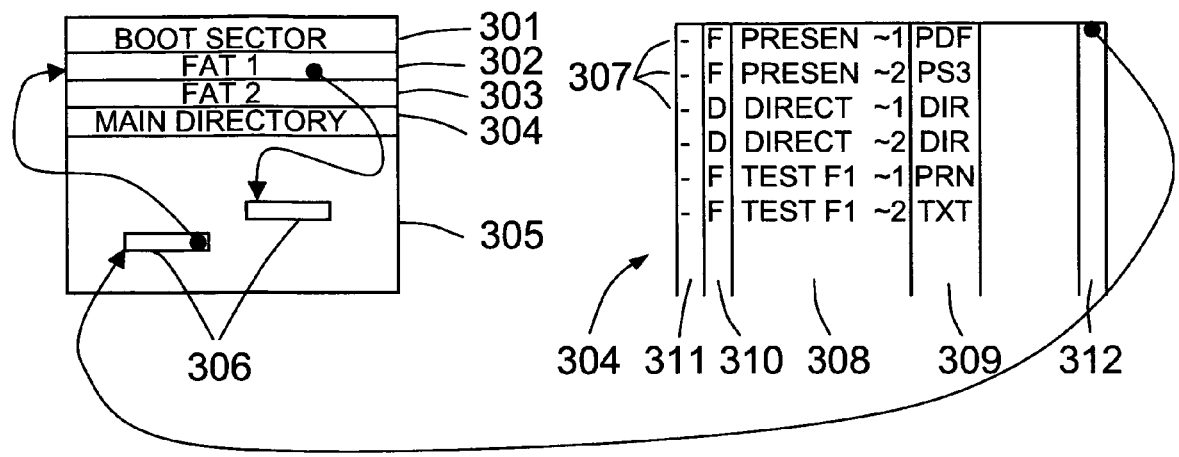
FIG. 3 is a schematic diagram that illustrates the organization of an FAT file system.

In the embodiment under consideration, the USB storage device is formatted with the FAT file system. However the method according to the present invention is also applicable for any other file system. The FAT file system is well known in the art. FIG. 3 shows schematically the organization of an FAT file system for a storage device, in particular the removable storage device under consideration for this case.

The storage device is organized in a boot sector (301), followed by a first File Allocation Table (302), followed by a second File Allocation Table (303). The second File Allocation Table (303) is a copy of the first File Allocation Table (302) for redundancy reasons. The second File Allocation Table (303) is followed by a Main Directory (304) and by a memory space (305) that is available for files and directories and is organized in so called clusters (306). A cluster (306) is the smallest amount of memory space available for a file.

The Main Directory (304) includes a number of entries (307) pointing to files and directories. Each entry in the Main Directory (304) includes a file name (308), with a fixed length of eight characters, a file extension (309) with a fixed length of three characters, a byte (310) indicating if the entry refers to a file or a directory, a byte (311) indicating if the entry has been deleted and thus may be rewritten with new data, a pointer (312) to the first cluster of the file and other metadata such as a timestamp for creation and file length. In case the entry refers to a subdirectory, the subdirectory is organized in the same kind of entries as the Main Directory. Files or directories needing more than one cluster use the File Allocation Table to determine where a next cluster belonging to the file or directory will be found in the storage device.

In FIG. 3, a number of files, present on the USB storage device, are indicated.

Figure 4:
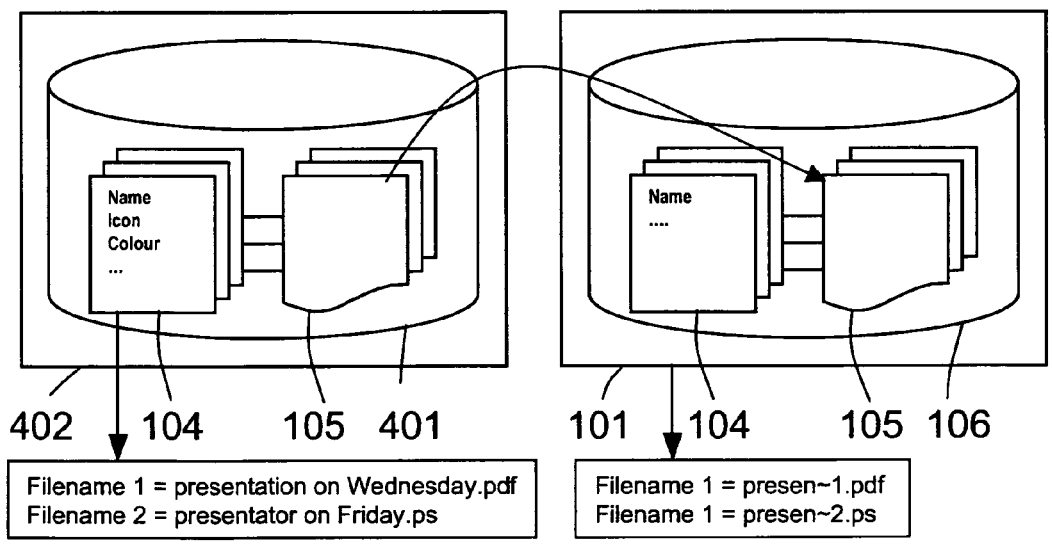
FIG. 4 is a diagram that illustrates truncation of the file names due to the FAT file system.

The original file names, as available on the workstation have been truncated to comply with the requirement of the file system under consideration, i.e. that file names have a length of 8 characters. This is also illustrated in FIG. 4. FIG. 4 shows truncation of file names when files are transported from a file system (401) on a workstation (402) towards a removable storage device (101).

An embodiment of the method of the present invention will now be described with reference to FIG. 5. Starting from step 501, in step 502, the reprographic machine checks if a removable storage device is inserted in the USB port available on the printer. The USB port is mounted in the direct vicinity of the operating panel of the printer. If a portable storage device is not detected (N), the method returns to starting step 501. If a portable storage device is detected (Y), in step 503, the file types of the files available on the storage device are determined. Heretofore, the system scans entries of the Main directory and available subdirectories for files. If an entry for a file is encountered, the file type is determined. This may be done by reading the extension field of the entry, but this is not reliable. It is advantageous to use, e.g. the UNIX command "file." This command returns a file type, based on the contents of the file. A file type defines how the content of a file is arranged and which rules govern the content. For the purpose of printing, in particular printable files are detected.

Examples of printable files are files with type PDF, Postscript 2, Postscript 3, PCL 5 or PCL 6.

In a next step 504, having assessed the type of a file, the content is further analyzed for extracting further supplemental data, and in particular a string that is usable as a file name, further referred to as a second filename to distinguish it from the file name present in the directory entry, that is referred to as the first file name. In particular, the contents are searched for strings that identify a job ticket. A job ticket is a set of data with a specific syntax that holds settings of the print job. Examples of job tickets are the JEC ticket and the PJL ticket.

If a job ticket can be identified, it is known which string or strings in the job ticket may be used for the second file name.

Figure 6:
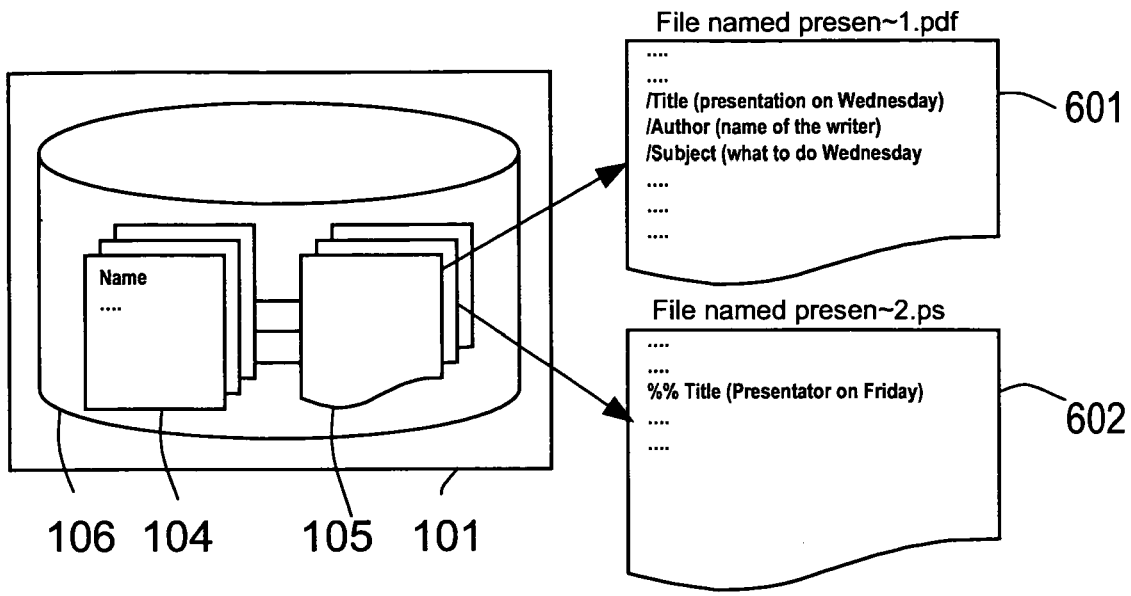
FIG. 6 is a schematic diagram that illustrates examples of strings that are recognized in the file contents as second file names.

FIG. 6 gives examples of strings that are recognized in the file contents as second file names for files of the type Postscript and PDF. In this example, the strings preceded by respectively/Title and %% Title are used for the second file name.

In an exemplary embodiment, the name of the print jobs as seen in the pocket mailbox is obtained as follows:

If a JEC ticket is found at the head of the file, the 'JOB-NAME' attribute is used as the filename.

If a PJL ticket is found at the head of the file, the 'NAME' attribute is used as the filename.

If no job name is found, the filename as present in the entry of the file system on the USB storage device is used.

Figure 7:
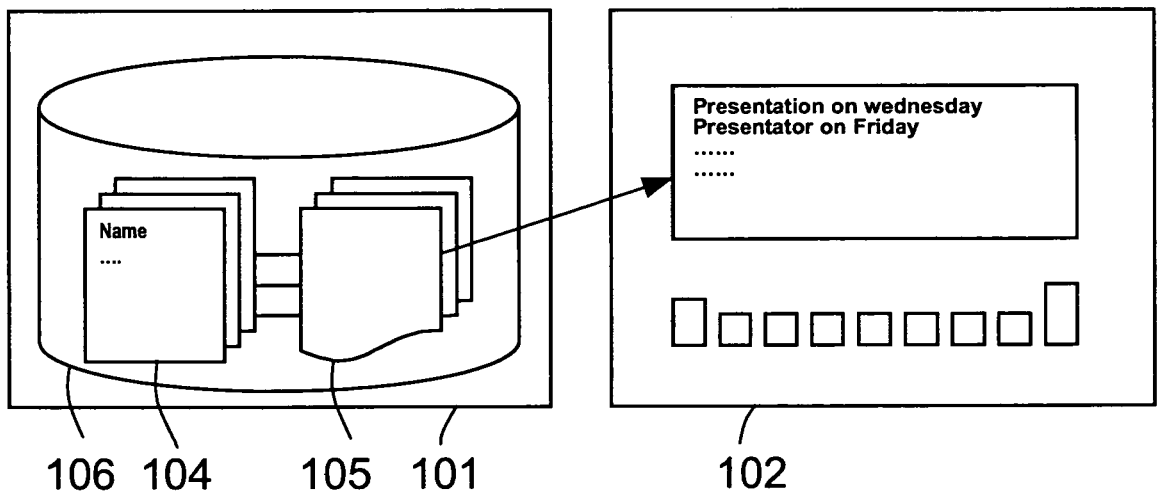
FIG. 7 is a schematic diagram that illustrates a result of the method according to an embodiment of the present invention.

In the exemplary embodiment illustrated in FIG. 6, a PDF analyzer is needed for (601) and a Postscript analyzer is needed for (602). Each of the analyzers decides which parts of the content are best suited for identification. This may be the unmodified title from the postscript file and a mix of the words from the subject, title and subject from the PDF file, and may be abbreviated to fit on the display as depicted in FIG. 7. The result of this embodiment of the present invention is a far better identification of the printable files on the user interface of the MFD.

Figure 5:
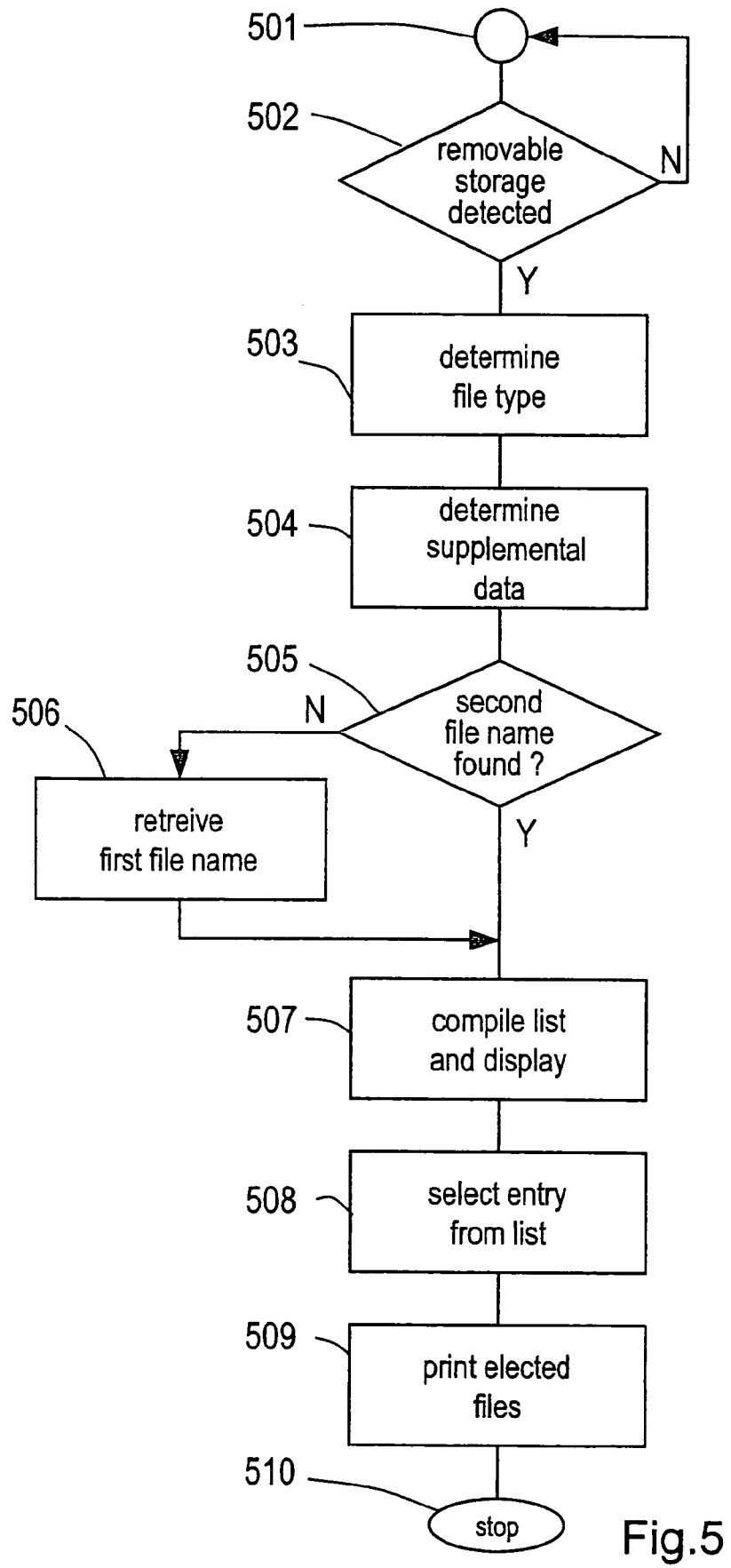
FIG. 5 is a flow chart illustrating the method according to an embodiment of the present invention.

Depending on the type of the file, the contents of the file is further analyzed in step 504 of FIG. 5. If supplemental data of all files, as far as appropriate, is extracted, in step 505 it is checked if a second file name has been extracted. If a second file name has been extracted (y) the method continues with step 507. If this is not the case (N), in step 506, the first file name is retrieved from the Main Directory (FIG. 3, 307) entry before the method continues with step 507.

A list of files is compiled (step 507). The list includes an entry for each file. Each entry has a number of fields. One field being the name field. The name field will contain the second file name if available. If no second file name is available, the first file name is retrieved from the entry in the file system of the USB storage device, and is incorporated in the name field. Other extracted supplemental data and metadata will be placed in other fields of the list. This additional data relates to parameters for the job and make up the job settings. After compilation of the list, the list is displayed on an operator screen of the operator panel of the reprographic machine. This is illustrated in FIG. 7.

Next, in step 508 of FIG. 5, the user selects a file from the list. If he wishes he may change settings concerning the way the file has to be printed. A list of supplemental parameters that may be extracted from the file content is displayed and some correspond to settings for the print job.

When the user has finished the settings, upon activation of the start button in step 509, the selected file will be printed in accordance with the set parameters, whereafter the end situation 510 is reached.

As an example, and in no way limiting, a list of parameters is shown in Table 1 that may be extracted from a file content as supplemental data and that are used to control the printing of the job.

TABLE 1

| parameter | value |
|---|---|
| staple | on off auto |
| orientation | portrait landscape |
| output tray | 1 2 3 4 |

TABLE 1-continued

| parameter | value |
|---|---|
| copies | any number |
| copy mode | simplex duplex |

Figure 8:
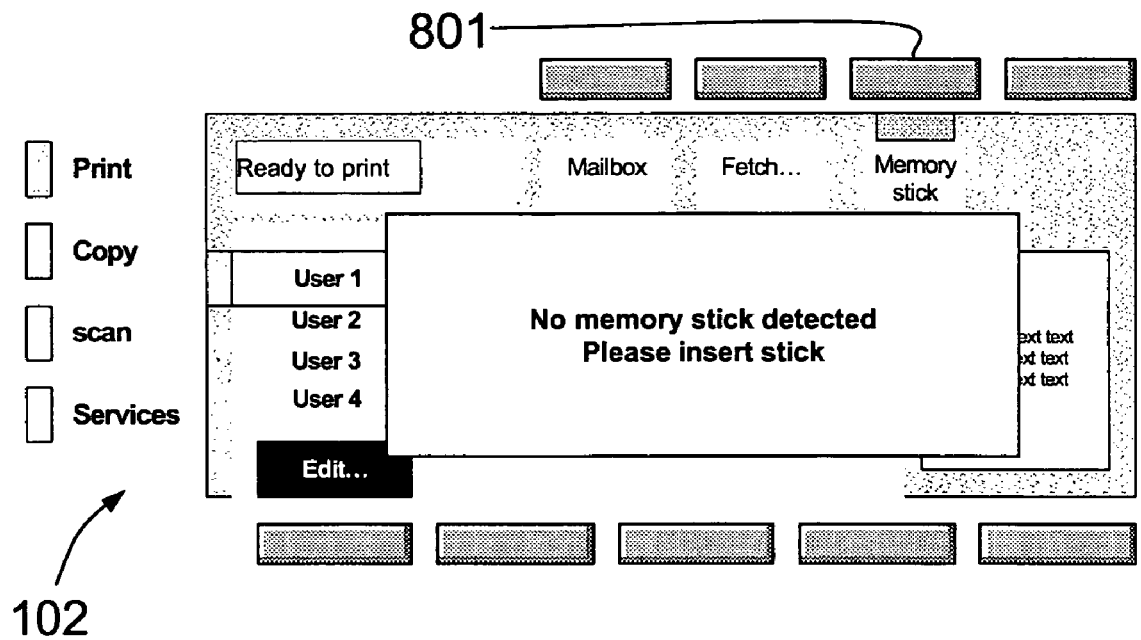
FIG. 8 is a illustration that shows an operator panel with an operator screen on an MFD when no use stick is present.

Printing from a portable storage device on a printer is now illustrated with reference to various operator screens displayed on the operating panel of a reprographic machine, shown in FIGS. 8-10.

The handling of printing from a USB storage device can be initiated at any moment. If the button "Memory Stick" (801) on the operator panel is activated and no USB storage device is attached to the MFD, the message 'No memory stick detected, please insert stick' is shown, (FIG. 8). If the user inserts a memory stick, a list (901) of names of the printable jobs is presented on the screen (FIG. 9). In situations without any pocket mailbox activity, the USB device can be removed without any problem, the UI will leave the pocket mailbox then.

Portable job information is only retrieved by the MFD after a trigger by the user. This means, that jobs on the USB storage device are not added to the mailbox of the local MFD. The user must initiate an action on the MFD again to make them visible. Therefore, the user must press the "Memory stick" soft key.

Figure 9:
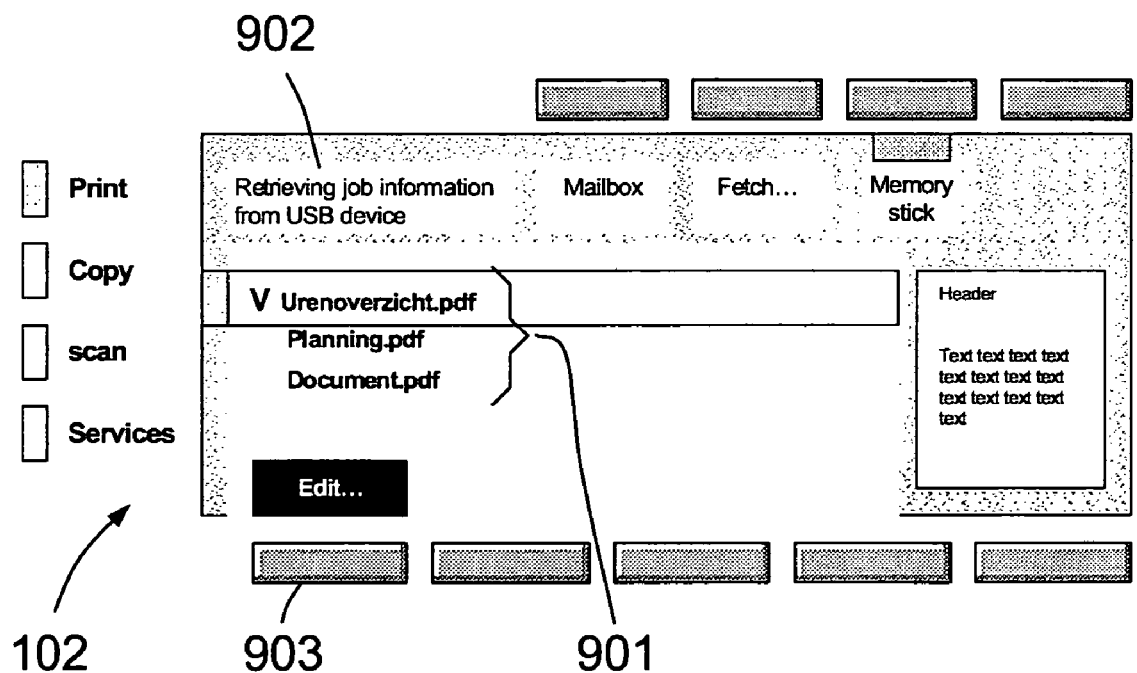
FIG. 9 is an illustration that shows an operator panel with an operator screen displaying a list of printable files.

When the user requests to use the pocket mailbox jobs, the list (901) of the printable files found in the USB storage device will be displayed, as indicated in FIG. 9.

The list of jobs can grow when the pocket mailbox is opened. In case of a slow USB device in combination with a lot of jobs on it, this may take a few seconds. During this time the message "Retrieving job information from USB device" is shown. The user can already start printing a job, when the MFD is still retrieving job information in the message area (902).

The list is sorted on the 'write date & time' of the jobs on the USB device, the newest job is placed on top of the list and is selected.

In this stage the portable jobs are shown in the UI of the MFD.

A '✓' in front of the job identifies if the job has been printed in this session. This information is not stored, so after removing the USB device and inserting it again all settings and '✓'s will be gone.

Using the 'Edit' soft key (903) a user can change Job settings, this is exactly the same as in the regular mailbox jobs.

If the user switches to another application, e.g. scan, the MFD will leave the 'pocket mailbox' context and will show the top menu of scanning.

All '✓' marks are cleared when leaving this menu, so if the user switches back to this menu again, no jobs are marked as printed.

Standard mechanisms of selection are available: select one job, all new jobs or all jobs.

When the user has no jobs on the USB device, the text is shown: "No printable files available."

Figure 10:
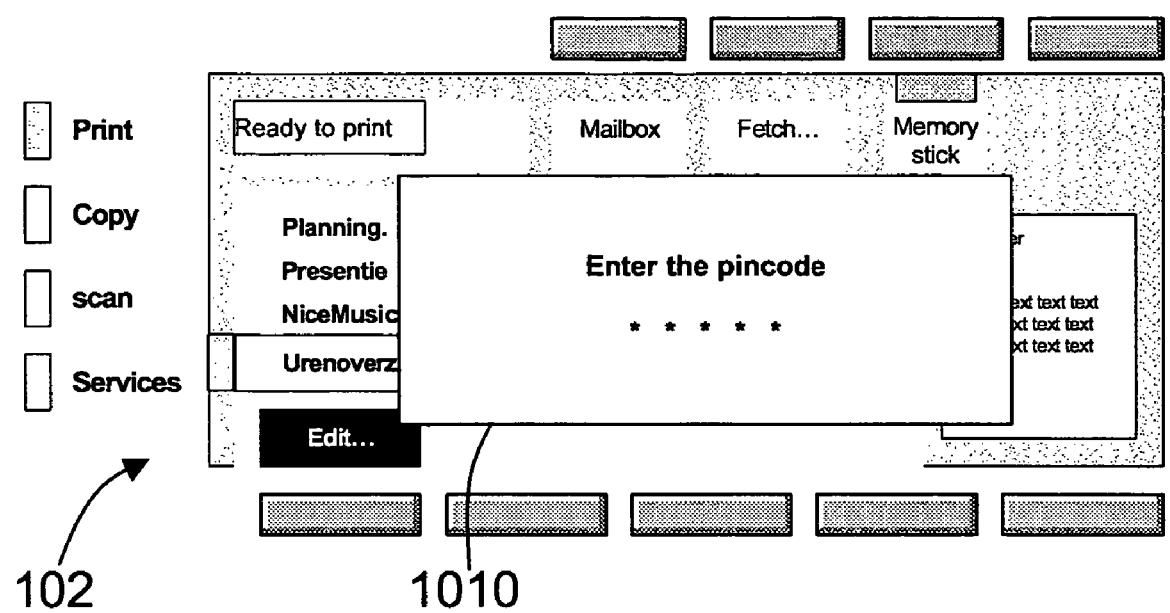
FIG. 10 is an illustration that shows an operator panel with an operator screen requesting for a pin code in order to print secured jobs.

Secured IP jobs can be printed via the portable storage functionality (FIG. 10). Heretofore, a dialog screen (1010) for entering a pin code pops up. After the operator has entered the pin code, the secured job will be printed. Printing secured portable jobs and printing multiple secured jobs are handled the same way as local jobs.

The portable jobs are not removed from the USB device, whether delete after print and/or shredding is configured or not. There is no soft key in the dialogue to delete files from the USB device. The automatic clean up mechanism does not apply to files on the USB storage device.

If the USB device is removed while a job is printing from the USB device, the job cannot be completed. An error message will be displayed.

The interrupt button remains operational during printing from a removable device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for accessing a file system in a computer system having a physical hardware storage device, the physical hardware storage device being provided with the file system, the file system storing for each file a first file name, metadata and file contents, said method for accessing the file system comprising the steps of:

extracting from the file contents of a file, supplemental data, where any of the supplemental data is a second file name;

compiling a list of files in the physical hardware storage device, where an entry in the list comprises a name field; and assigning the second file name to the name field if the extracting step delivers a second file name as one of the supplemental data from the file contents.

2. The method according to claim 1, further comprising the step of assigning the first file name to the name field if no second file name is extracted from the file contents.

3. The method according to claim 2, further comprising the steps of:

providing an operator screen for the user, where an entry of the list is a selectable item; and starting processing of a file, associated with a selected entry and upon reception of a start command, initiated by a user.

4. The method according to claim 3, wherein the step of processing the file is based on the supplemental data of the file.

5. The method according to claim 3, further comprising the step of, for a selected entry, changing supplemental data in dependence of user interaction.

6. The method according to claim 1, further comprising the steps of:

providing an operator screen for the user, where an entry of the list is a selectable item; and starting processing of a file, associated with a selected entry and upon reception of a start command, initiated by a user.

7. The method according to claim 6, wherein the step of processing the file is based on the supplemental data of the file.

8. The method according to claim 6, further comprising the step of, for a selected entry, changing supplemental data in dependence of user interaction.

9. The method according to claim 1, wherein the computer system is a controller of a reprographic apparatus and the step of processing the file comprises the step of printing the file.

10. The method according to claim 1, wherein the storage is a removable storage device.

11. The method according to claim 1, further comprising the step of, upon detection of the presence of a removable storage device, carrying out said steps of extracting, compiling and assigning.

12. The method according to claim 11, wherein the removable storage device is a USB stick.

13. An apparatus for accessing a file system in a computer system having a storage device, the storage device being provided with the file system, the file system storing for each file a first file name, metadata and file contents, said apparatus for accessing the file system comprising:

an extraction unit that extracts from the file contents of a file, supplemental data, where any of the supplemental data is a second file name;

a compiling unit that compiles a list of files in the storage device, where an entry in the list comprises a name field; and an assigning unit that assigns the second file name to the name field if the extracting step delivers a second file name as one of the supplemental data from the file contents.

14. A method of exchanging files between computer systems having physical storage devices or between a computer system having a physical storage device and a reprographic apparatus having a physical storage device, comprising:

checking if a removable physical storage device is inserted in a port available on the reproductive device, and if the removable physical storage device is not detected, continuing to check if the removable physical storage device is inserted;

checking if a removable physical storage device is inserted in a port available on the reproductive device, and if the removable physical storage device is detected, determining types of the files available on the removable physical storage device;

analyzing files having a first file name, metadata and file contents available on the removable physical storage device for extracting further supplemental data from the file contents including a string that is usable as a second file name; and compiling a list of files on the removable storage device, where an entry in the list comprises a name field; and assigning the string that is usable as a second file name to the name field if the extracting step delivers the string that is usable as a second file name as one of the supplemental data from the file contents.

* * * * *